United States Patent

[11] 3,624,768

| [72] | Inventor | Werner Nussli |
| | | Gams Saint Gall, Switzerland |
| [21] | Appl. No. | 15,974 |
| [22] | Filed | Mar. 3, 1970 |
| [45] | Patented | Nov. 30, 1971 |
| [32] | Priority | Mar. 4, 1969 |
| [33] | | Austria |
| [31] | | A 2110/69 |

[54] SINGLE-PLATE ELECTROMAGNETIC CLUTCH
6 Claims, 1 Drawing Fig.

[52] U.S. Cl. .................................................. 192/84 C
[51] Int. Cl. .................................................. F16d 27/10
[50] Field of Search ...................................... 192/84 C

[56] References Cited
UNITED STATES PATENTS

| 3,326,343 | 6/1967 | Stuckens et al. | 192/84 C |
| 3,361,238 | 1/1968 | Yokel | 192/84 C |
| 3,381,784 | 5/1968 | Miller et al. | 192/84 C X |
| 3,404,762 | 10/1968 | Le Blanc | 192/84 C |
| 3,530,416 | 9/1970 | Klinkenberg | 192/84 C X |

*Primary Examiner*—Allan D. Herrmann
*Attorney*—McGlew and Toren

ABSTRACT: The invention of this disclosure relates to an electromagnetic clutch, without sliprings, comprising a coil support unit an armature plate movable relative to the coil support unit and a hub unit, preferably carrying a friction lining for the armature plate, in which the coil support unit has an inner and outer periphery formed with seatings for support bearings.

PATENTED NOV 30 1971
3,624,768
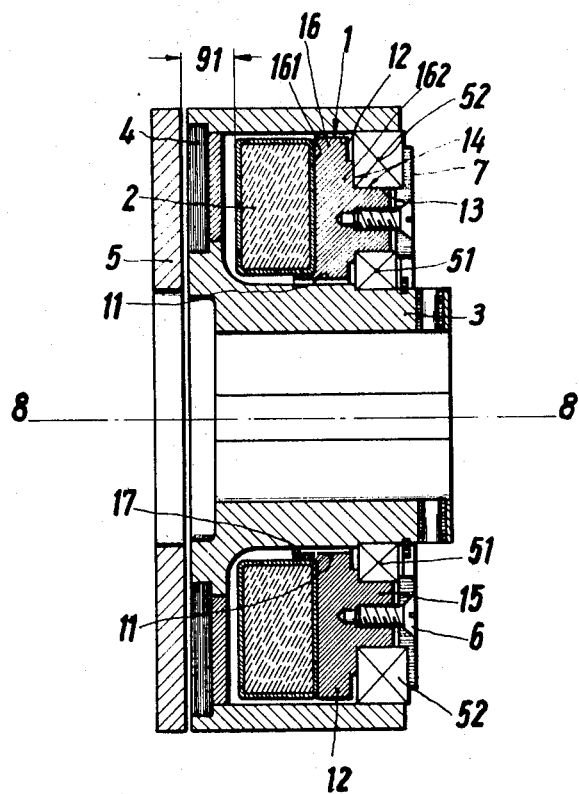
Inventor:
WERNER NÜSSLI
By: McGlew & Toren
ATTORNEYS

SINGLE-PLATE ELECTROMAGNETIC CLUTCH

BACKGROUND OF THE INVENTION

The present invention relates to electromagnetic clutches comprising a magnetic unit and an armature plate which is axially movable relative to the magnetic unit.

The magnetic unit normally comprises a coil support unit for the excitation coils, the excitation of which causes a force field, having lines of force which act on the armature plate and draw it to the magnetic unit. It is also known to arrange an energy store between the armature plate and a coupling component next in sequence in the transmission direction; this energy store may be in the form of springs which, after the excitation current for exciting the magnetic coil, has been shut off, returns the armature plate to its starting position.

In the known method of construction of such electromagnetic clutches, the coil support is introduced on to the hub member with the interposition of a roller bearing. The operation of such clutches has shown, however, that both in the electromagnetic and in mechanical respects appreciable advantages are to be achieved if a departure is made from this method of construction. In particular the path for the magnetic flux is relatively long, so that the switching times are adversely affected. With regard to the mechanical operation, as a result of the one-sided arrangement of the roller bearing as a function of the play occurring in it, a tilting of the coil support unit may take place, which can lead to hard running of the hub member and the lining support.

BRIEF SUMMARY OF THE INVENTION

It is an object of this invention to fundamentally improve these conditions by constructing an electromagnetic clutch with an increased number of the roller bearing components. Such a construction does not appear obvious since an increase in the number of roller bearing components must lead to an increase in the prime cost. This economic disadvantage is minimal compared to the technical improvements which may be achieved as a result of the electromagnetic clutch constructed according to the present invention.

According to the present invention there is provided an electromagnetic clutch, without sliprings, comprising a hub member, a coil radially spaced from said hub member, a coil support carrying said coil, a pair of seatings formed on said coil support and spaced radially of said hub member with respect to each other to receive bearings for locating said support relative to said hub member for relative rotation and an armature plate displaceable under the control of said coil.

Conveniently, the coil support is annular, said coil being carried on one face of said coil support, a ring flange provided on the opposite face of said coil support, said ring flange being furthest from said armature plate, said seatings, being formed in inner and outer peripheries of said ring flange, a clutch axis, said seatings being on generatrixes coaxial with said clutch axis and in conjunction with said opposite face, said bearings being roller bearings.

A further flange ring is provided on the said one face of the coil support adjacent said hub member which forms in conjunction with said one face a seating for said coil.

Further advantages arise if the flange ring of the coil support furthest from the armature is extended for the attachment of a covering disc bounding the bearing seatings in an axial direction, for example by being fitted with axial threaded holes to receive fixing screws for this cover plate. The covering plate may be used as a hermetically sealed closure for the internal parts of the clutch, so that the inside cannot become dirty if the clutch is subjected to very dirty conditions in operation. It also permits flatter coils, having a greater diameter due to the elimination of the sleeve necessary in known construction for supporting the roller bearings, to be used, leading to an increase in the number of ampere turns, which are related to the magnetic field strength. Reference has already been made to the shortening of the magnetic flux which is to be achieved by these means, and likewise, that this leads to shorter engaging times. The new form of construction leads also to an increase in the operating surface of the friction lining, so that, in comparison with known constructions, the means transmission diameter, determined by otherwise equal measurements, is increased. A further technical advantage can be seen in that the connecting webs to the friction lining, hitherto necessary can be eliminated and, finally, that a considerable elimination of magnetic leakage flux ensues, which reduced the efficiency of hitherto known forms of clutch construction.

One embodiment of the invention will now be described by way of example with reference to the accompanying drawing which shows an axial sectional view of an electromagnetic single-plate clutch.

Referring now to the drawings, in detail, the electromagnetic single-plate clutch comprises an annular coil support generally indicated at 1 which is mounted stationary and carries on one face a coil 2. The coil support 1 and associated coil 2 encircle a hub member 3 which extends into an annular flange at one end carrying a friction lining 4. Opposite to the friction lining 4 is an annular armature plate 5. This is the basic construction of a conventional-type magnetic clutch.

According to the present invention the coil support 1 is formed at its inner circumference 11 and its outer circumference 12 with seatings 13 and 14, respectively, for roller bearings 51 and 52 which may alternatively be grooved ball bearings. These seatings are formed in the inner and outer peripheries of a ring flange 15 formed integral with a center plate 16 of the coil support 1. The ring flange 15 is located on the opposite face of the coil support center plate 16 to the coil 2 and is furthest from the armature plate 5. On the other face of the coil support center plate 16 is a second flange ring 17 the outer periphery of which together with the face 161 of the plate 16 form a seating for the coil 2.

The ring flange 15 is provided with screw-threaded holes 151, for receiving screws 6 for securing an annular cover plate 7 to the coil support 1. This cover plate 7 forms a stop in the axial direction of the clutch to retain the roller bearings 51 and 52 in their seatings. The cover plate also acts as a seal hermetically sealing the internal parts of the clutch from the outside thus preventing any foreign bodies from entering the interior of the clutch as may be necessary if the clutch has to operate in a dust and/or moisture ladened atmosphere.

The clutch is symmetrically rotatably mounted about an axis 8—8 and the seatings 13 and 14 for the bearings are on generatrixes coaxial with the clutch axis.

One of the advantages of the clutch described and illustrated is the extraordinarily small distance indicated at 91 between the armature plate 5 and the outer face of the coil 2. This has been enlarged in the drawing for the purpose of clarity, but it is to be understood that this can be reduced still further.

It will also be appreciated that construction of the clutch according to the invention provides a greater stabilization of the coil support 1 which is due to the two roller bearings 51 and 52 of increased strength each acting on their respective circumferences. Any tilting and hard running of the friction lining 4 is thereby eliminated. The large flat form of the coil 2 as well as the increased surface of the friction lining 4 have many advantages over the known clutches of this type as previously mentioned.

Various modifications may be made to the invention for example, the ring-shaped or annular parts described may be replaced by rings having gaps to form segments or sector-shaped sections.

What is claimed is:

1. An electromagnetic clutch, without sliprings, comprising a hub member, a coil radially spaced from said hub member, a coil support carrying said coil, a pair of seatings formed on said coil support and spaced radially of said hub member with respect to each other to receive bearings for locating said support relative to said hub member for relative rotation and an armature plate displaceable under the control of said coil.

2. A clutch according to claim 1 in which said coil support is annular, said coil being carried on one face of said coil support, a ring flange provided on the opposite face of said coil support, said ring flange being furthest from said armature plate, said seatings being formed in inner and outer peripheries of said ring flange, a clutch axis, said seatings being on generatrixes coaxial with said clutch axis and in conjunction with said opposite face, said bearings being roller bearings.

3. A clutch according to claim 2 in which a further flange ring is provided on the said one face of the coil support adjacent said hub member which forms in conjunction with said one face a seating for said coil.

4. A clutch according to claim 2 including an annular cover plate releasably secured to said ring flange to cover and seal said clutch.

5. A clutch according to claim 1 in which said bearings are ball bearings.

6. An electromagnetic clutch, without sliprings comprising a hub member, a coil radially spaced from said hub member, a coil support carrying said coil, a pair of seatings formed on said coil support and spaced radially of said hub member with respect to each other to receive bearings for locating said support relative to said hub member for relative rotation, an armature plate displaceable under the control of said coil, said coil support being annular, said coil being carried on one face of said coil support, a ring flange provided on the opposite face of said coil support, said ring flange being furthest from said armature plate, said seatings being formed in inner and outer peripheries of said ring flange, a clutch axis, said seatings being on generatrixes coaxial with said clutch axis and in conjunction with said opposite face, a further flange ring provided on the said one face of the coil support adjacent said hub member which forms in conjunction with said one face a seating for said coil, and a cover plate releasably secured to said ring flange to cover and seal said clutch, said bearings being ball bearings.

* * * * *